(12) United States Patent
Krause et al.

(10) Patent No.: US 8,503,437 B2
(45) Date of Patent: Aug. 6, 2013

(54) INTEGRATED CUSTOMER PREMISES EQUIPMENT DEVICE

(75) Inventors: Joel M. Krause, Dallas, TX (US); G. Lance Lockhart, Allen, TX (US); John Truetken, McKinney, TX (US); Christopher Martin, Cedar Hill, TX (US); Jeffrey Haltom, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2232 days.

(21) Appl. No.: 10/387,126

(22) Filed: Mar. 13, 2003

(65) Prior Publication Data
US 2004/0181686 A1 Sep. 16, 2004

(51) Int. Cl.
*H04L 12/66* (2006.01)
(52) U.S. Cl.
USPC ........ 370/353; 370/352; 370/395.5; 370/466; 709/224

(58) Field of Classification Search
USPC .............. 370/230, 230.1, 235, 352, 353, 354, 370/395.4, 395.5, 465, 466, 468; 709/223–226; 710/62–65, 69; 713/153, 154
See application file for complete search history.

(56) References Cited

U.S. PATENT DOCUMENTS

| | | | | |
|---|---|---|---|---|
| 5,144,651 | A | * | 9/1992 | Cooper ...................... 379/93.32 |
| 5,610,905 | A | * | 3/1997 | Murthy et al. ................ 370/401 |
| H1896 | H | | 10/2000 | Hoffpauir et al. |
| 6,353,614 | B1 | * | 3/2002 | Borella et al. ................ 370/389 |
| 6,373,817 | B1 | | 4/2002 | Kung et al. |
| 6,938,080 | B1 | * | 8/2005 | Kahveci et al. .............. 709/223 |
| 2001/0033583 | A1 | * | 10/2001 | Rabenko et al. ............. 370/503 |
| 2002/0131575 | A1 | * | 9/2002 | Gallant .................... 379/220.01 |
| 2003/0021283 | A1 | * | 1/2003 | See et al. ...................... 370/401 |
| 2006/0098670 | A1 | * | 5/2006 | Voit et al. ..................... 370/401 |

FOREIGN PATENT DOCUMENTS

WO    WO 0152460 A2 * 7/2001
WO    WO 03009527 A2 * 1/2003

OTHER PUBLICATIONS

Auer, E. et al., "DBAS-A Digital Broadband Access System for Flexible Introduction of Broadband Services," International Conference on Communication Technology Proceedings 1996. ICCT'96. May 5-7, 1996. vol. 2, pp. 743-746.*
Mediatrix 1102 IP Telephony Device Product Specifications; Mediatrix Telecom, Inc.; Montreal, Quebec; Jun. 4, 2002; 4 pages.
Cisco 26xx/36xx/3810 Product Update; Session 1208; Cisco Systems, Inc.; 1998; slides 1-62.
Cisco ATA 186—Analog Telephone Adaptor; Cisco Product Catalog; Jan. 2003; pp. 1-4.
A. Johnston, et. al., "SIP Telephony Call Flow Examples", Internet Draft, Internet Engineering Task Force, Jun. 2001.
M. Handley, H. Schulzrinne, E. Schooler, and J. Rosenberg, "SIP: Session Initiation Protocol", RFC 2543, Mar. 1999.
D. Mills, "Network Time Protocol (Version 3) Specification, Implementation and Analysis," RFC 1305, Mar. 1992.

(Continued)

*Primary Examiner* — Donald Mills

(57) ABSTRACT

A Session Initiation Protocol (SIP) device includes one or more voice ports configured to provide voice services; one or more data ports configured to provide data services; firewall logic configured to filter incoming traffic; and quality of service (QoS) logic configured to provide QoS services for traffic transmitted from the SIP device.

28 Claims, 7 Drawing Sheets

OTHER PUBLICATIONS

J. Rosenberg et el., "SIP: Session Initiation Protocol", Internet Draft [rfc2543bis05], Internet Engineering Task Force, Oct. 2001.

R. Sparks, "SIP Call Control: Transfer", version 05, Internet Draft, Internet Engineering Task Force, Feb. 2001.

J. Rosenberg and H. Schulzrinne, "The SIP Supported Header", Internet Draft, Internet Engineering Task Force, Mar. 2000.

H. Schulzrinne, S. Casner, "RTP Profile for Audio and Video Conferences with Minimal Control", Internet Draft, Internet Engineering Task Force, Jul. 2001.

H. Schulzrinne et al, "RTP: A Transport Protocol for Real-Time Applications" RFC 1889, Jan. 1996.

H. Schulzrinne and Petrack, "RTP Payload for DTMF Digits, Telephony Tones and Telephony Signals", RFC 2833, May 2000.

B. Manning, "DNS NSAP RRs," RFC 1348, Jul. 1992.

A. Gulbrandsen, P. Vixie, and L. Esibov, "A DNS RR for specifying the location of services (DNS SRV)", RFC 2782, Feb. 2000.

S. Donovan, M. Cannon, H. Schulzrinne, J. Rosenberg, and A. Roach, "SIP 183 Session Progress Message", Internet Draft, Internet Engineering Task Force, Oct. 1999.

G. Camarillo, A. Roach, "ISUP to SIP Mapping", Internet Draft, Internet Engineering Task Force. Jun. 2001.

R. Zopf, "RTP Payload for Comfort Noise", Internet Draft, Internet Engineering Task Force, Jul. 2001.

S. Casner, V. Jacobson, "Compressing IP/UDP/RTP Headers for Low-Speed Serial Links", RFC 2508, Proposed Standard, Internet Engineering Task Force, Feb. 1999.

M. Handley, H. Schulzrinne, E. Schooler, and J. Rosenberg, A. Johnston, R. Sparks, J. Peterson, G. Camarillo, "SIP: Session Initiation Protocol", Internet Draft [rfc3261], Internet Engineering Task Force, Jun. 2002.

W. Marshall, K. Ramakrishnan, E. Miller, G. Russell, B. Beser, M. Mannette, K. Steinbrenner, D. Oran, F. Andreasen, J. Pickens, P. Lalwaney, J. Fellows, D. Evans, K. Kelly, M. Watson, "SIP Extensions for Caller Identity and Privacy", Internet Draft, Internet Engineering Task Force, May 2001.

K. Lingle, J. Maeng, J-F. Mule, D. Walker, "Management Information Base for Session Initiation Protocol", Internet Draft, Internet Engineering Task Force, Jun. 2001.

M. Handy, V. Jacobson, "SDP: Session Description Protocol", RFC 2327, Internet Engineering Task Force, Apr. 1998.

R. Sparks, "The SIP Refer Method", Internet Draft, Internet Engineering Task Force, Jul. 2002.

C. Brown, A. Malis, "Multiprotocol Interconnect over Frame Relay", RFC2427, Proposed Standard, Internet Engineering Task Force, Sep. 1998.

T. Bradley, . Brown, A. Malis, "Multiprotocol Interconnect over Frame Relay", RFC1490, Proposed Standard, Internet Engineering Task Force, Jul. 1993.

J. Li, J. Mule, "SIP T.38 Call Flow Examples and Best Current Practices", Internet Draft, Internet.

* cited by examiner

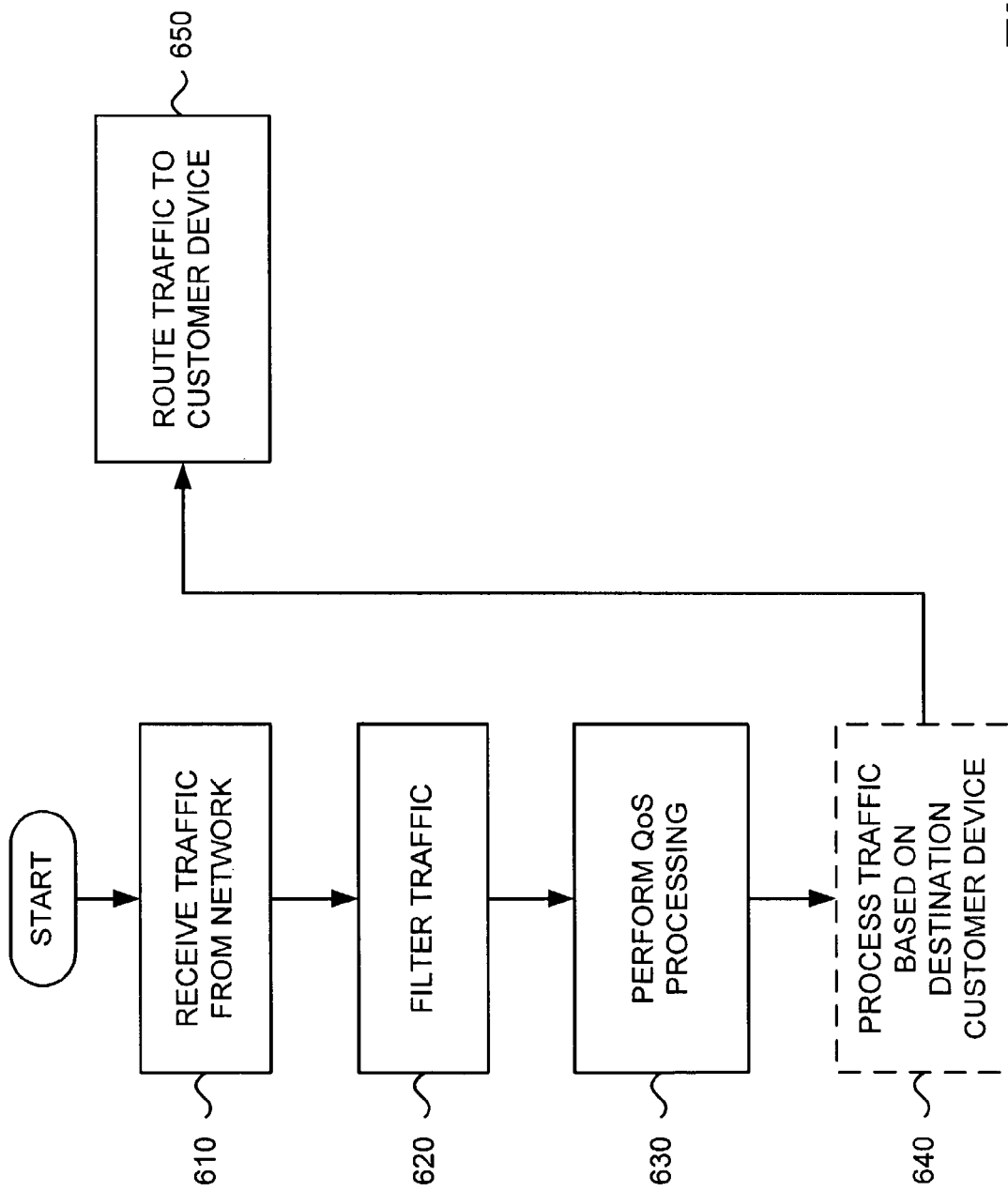

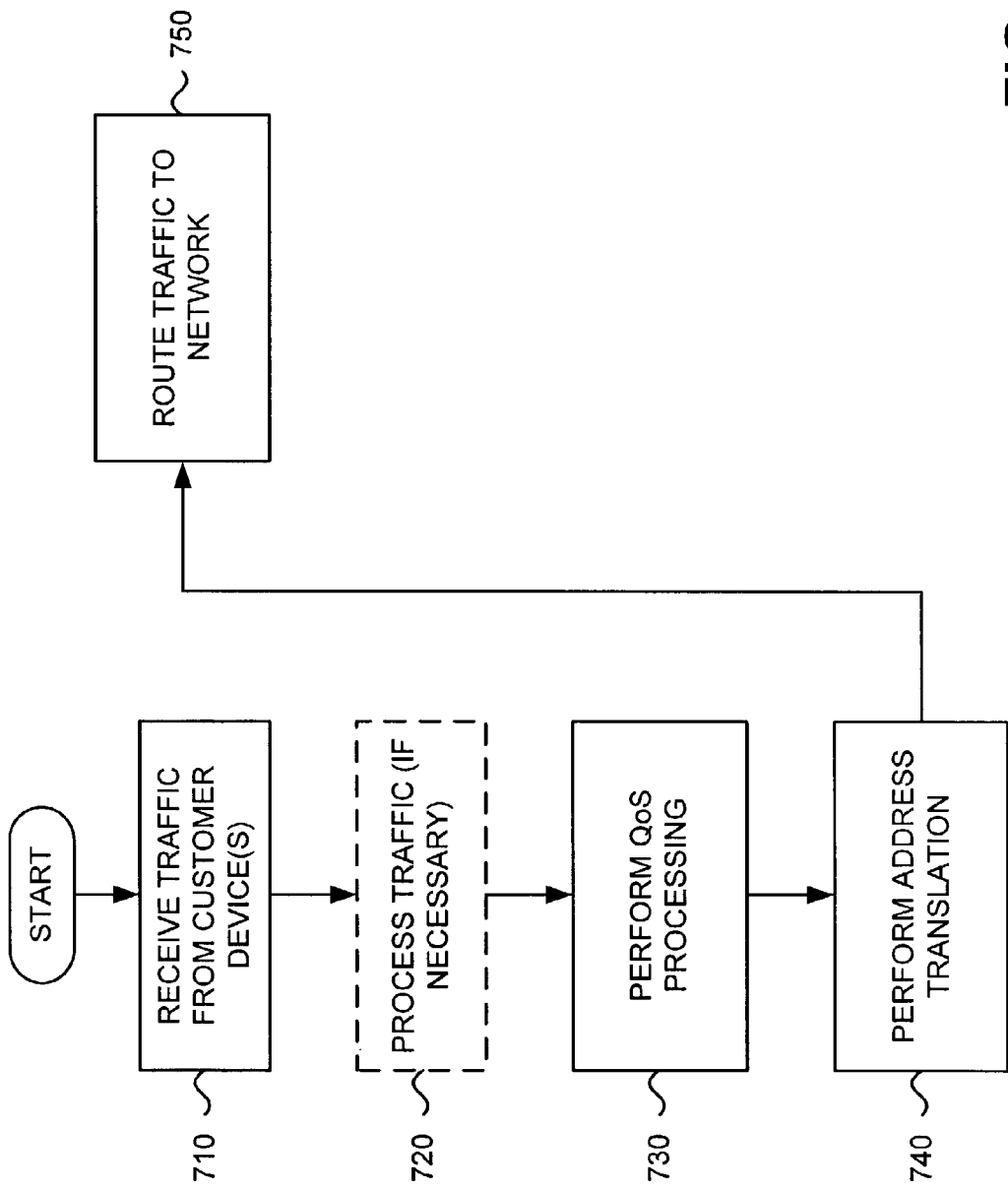

INTEGRATED CUSTOMER PREMISES EQUIPMENT DEVICE

FIELD OF THE INVENTION

The present invention relates generally to communications networks and, more particularly, to an integrated customer premises equipment (CPE) device.

BACKGROUND OF THE INVENTION

Telecommunications service providers continually increase the number of services and products they offer to customers. A recent trend, for example, is a desire to offer secure broadband, wireless, and Internet services. As competition increases, service providers will need to provide an increased level of support for these advanced data services while keeping costs down.

Many components are often necessary to build a secure telecommunications network. Whether a customer desires Internet access or a firewall, the customer is typically forced to support many different pieces of equipment in their network. For many small to medium sized businesses desiring an effective network, continuing to add new hardware for each new service or feature can be quite costly.

Accordingly, there is a need in the art for a "one box" solution that provides customers with various features and services of interest to the customers.

SUMMARY OF THE INVENTION

Systems and methods consistent with the principles of the invention address this and other needs by providing an integrated Session Initiation Protocol (SIP) enabled CPE device that provides customers with firewall capabilities, quality of service (QoS) processing, routing capabilities, and Ethernet switching functionality.

In an implementation consistent with the present invention, a network device includes one or more voice ports configured to communicate with one or more analog devices; one or more data ports configured to communicate with one or more SIP devices; one or more network ports configured to communicate with a network; filtering logic configured to filter traffic received from the one or more network ports; and QoS logic configured to perform QoS processing on traffic received from the one or more voice ports, the one or more data ports, and the one or more network ports.

In another implementation consistent with the present invention, a network device includes at least one voice port configured to communicate with at least one analog telephone; at least one voice trunk configured to communicate with a private branch exchange; at least one data port configured to communicate with at least one SIP device; at least one network port configured to communicate with a network; and management logic configured to provide QoS management and security for the at least one voice port, the at least one voice trunk, the at least one data port, and the at least one network port.

In yet another implementation consistent with the present invention, a network device includes means for communicating with at least one analog telephone device; means for communicating with at least one SIP device; means for communicating with a network; means for providing QoS services for traffic received via the means for communicating with at least one analog telephone device, the means for communicating with at least one SIP device, and the means for communicating with a network; means for filtering traffic received from the network; and means for providing at least one of network address translation and port address translation.

In a further implementation consistent with the principles of the invention, a SIP device includes one or more voice ports configured to provide voice services; one or more data ports configured to provide data services; firewall logic configured to filter incoming traffic; and QoS logic configured to provide QoS services for traffic transmitted from the SIP device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 illustrates an exemplary process for routing traffic from a network through the interface device in an implementation consistent with the principles of the invention; and FIG. 7 illustrates an exemplary process for routing traffic from one or more customer devices through the interface device in an implementation consistent with the principles of the invention.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide an integrated SIP-enabled CPE device that provides customers with, inter alia, a firewall, quality of service (QoS) processing, routing capabilities, and Ethernet switching functionality.

Exemplary System

Figure 1:
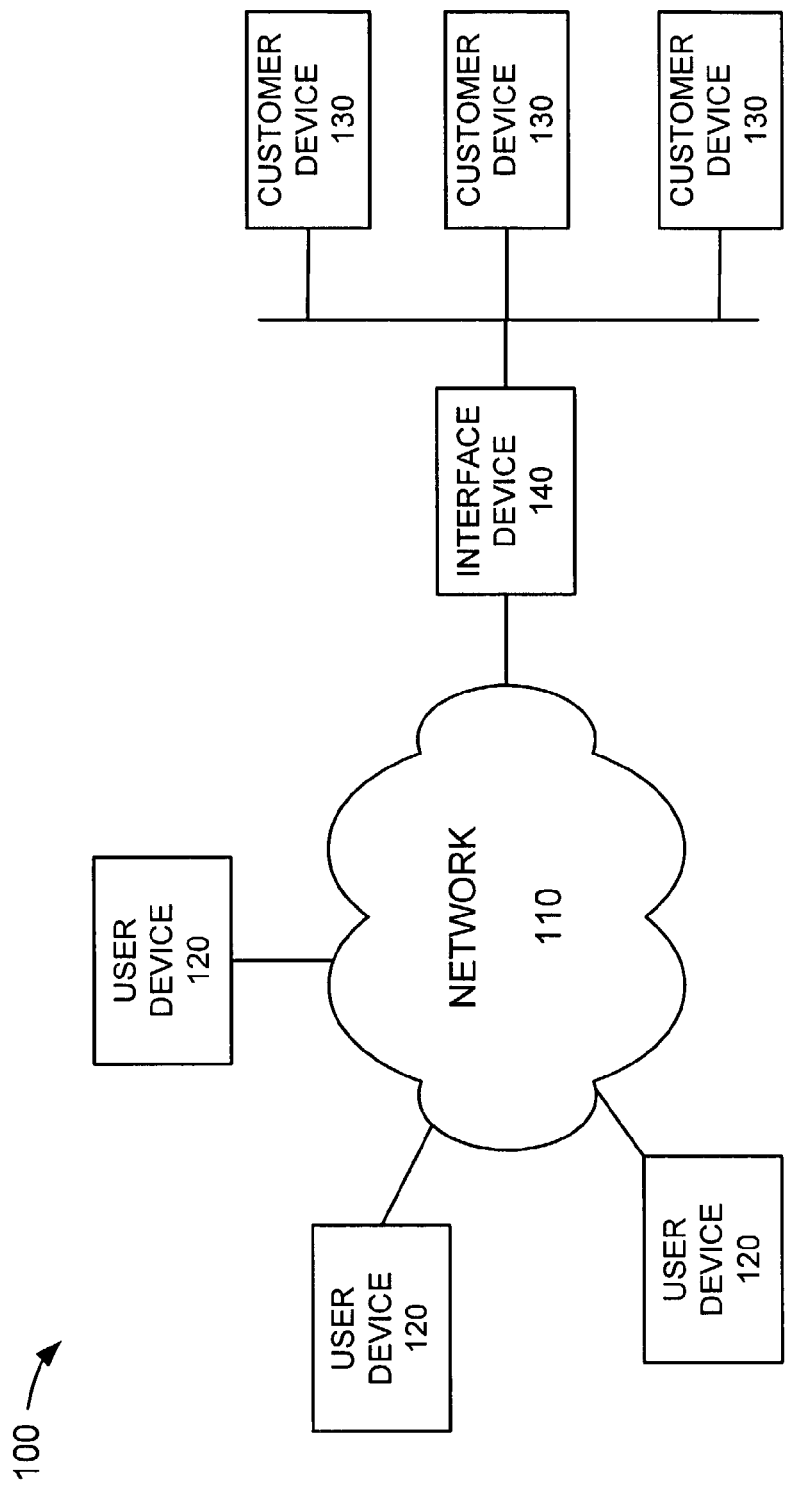
FIG. 1 illustrates an exemplary system in which systems and methods, consistent with the present invention, may be implemented.

FIG. 1 illustrates an exemplary system 100 in which systems and methods, consistent with the present invention, may be implemented. As illustrated, system 100 may include a group of user devices 120 that connect to a network 110 and a group of customer devices 130 that connect to network 110 via an interface device 140. The number of devices illustrated in FIG. 1 is provided for simplicity. In practice, a typical network could include more or fewer user devices 120, customer devices 130, and interface devices 140 than illustrated in FIG. 1.

Network 110 may include one or more networks, such as the Internet, an intranet, a local area network (LAN), a wide area network (WAN), or another type of network that is capable of transmitting voice and data communications from a source device to a destination device. Network 110 may also include one or more public switched telephone networks (PSTNs).

User devices 120 may include devices, such as personal computers, laptops, SIP telephone devices, or other devices capable of transmitting/receiving voice and data communications to/from network 110. User devices 120 may connect to network 110 via wired, wireless, or optical connections. Customer devices 130 may include any common customer telephone device, such as one or more analog telephones, private branch exchanges (PBXs), SIP telephone devices, and/or other types of wired or wireless devices. As shown in FIG. 1, customer devices 130 may be part of a customer's LAN.

Interface device 140 is a stand-alone device that provides secure communication services to customer devices 130. To provide these communication services, interface device 140 supports a variety of protocols, such as the Internet Protocol, the Dynamic Host Configuration Protocol, the Session Initiation Protocol, the User Datagram Protocol, the Transmission Control Protocol, the Session Description Protocol, the Real-time Transport Protocol (RTP), the Real-time Transport Control Protocol, the Audio Video Protocol, the T.38 fax protocol, the Internet Control Message Protocol, and other types of communication protocols.

As will be described in detail below, interface device 140 provides customer devices 130 with digital subscriber line (DSL) and frame relay access to network 110. Interface device 140 may also provide voice ports for stand-alone analog telephones, T1 or fractional T1 voice trunks for PBX connectivity, Ethernet ports and routing capabilities for data devices, firewall functionality, network address translation (NAT) and port address translation (PAT) functionality, and QoS management.

Figure 2:
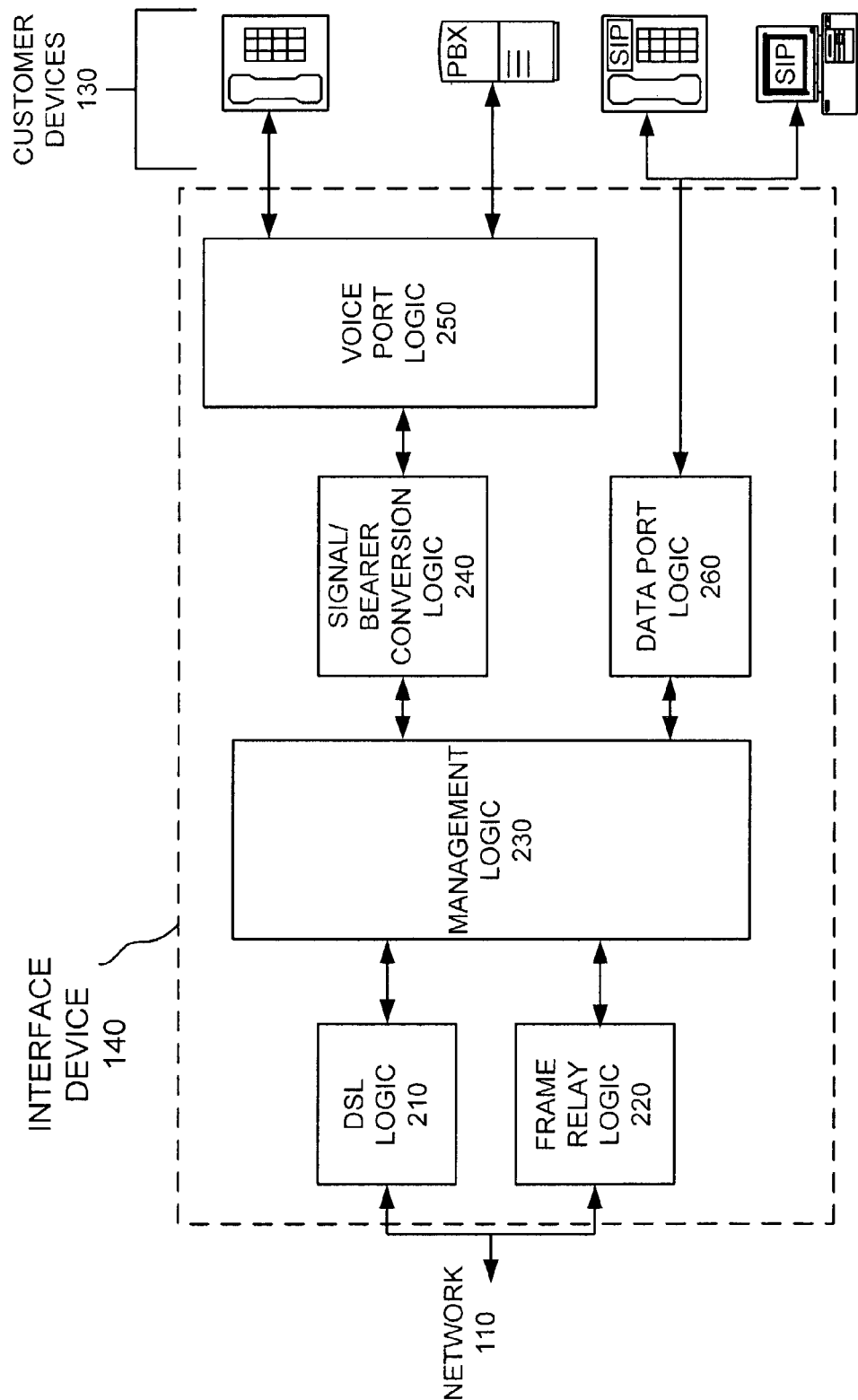
FIG. 2 illustrates an exemplary configuration of the interface device of FIG. 1 in an implementation consistent with the principles of the invention.

FIG. 2 illustrates an exemplary configuration of interface device 140 in an implementation consistent with the principles of the invention. As illustrated, interface device 140 may include DSL logic 210, frame relay logic 220, management logic 230, signal/bearer conversion logic 240, voice port logic 250, and data port logic 260. It will be appreciated that interface device 140 may include other logic than that illustrated in FIG. 2 in the reception, processing, and/or transmission of data.

DSL logic 210 may include one or more DSL ports. In one implementation, DSL logic 210 may include one or more RJ-11 interfaces. DSL logic 210 supports well-known DSL protocols for communicating with digital subscriber line access multiplexers (DSLAMs), such as an integrated services digital network digital subscriber line (IDSL) signaling protocol, a symmetric digital subscriber line (SDSL) signaling protocol, and a Global.standard High-bit-rate digital subscriber line (G.SHDSL) signaling protocol, and the like.

Frame relay logic 220 may include one or more frame relay ports. In one implementation, frame relay logic 220 may include one or more digital signal 1 (DS1) American National Standards Institute (ANSI) T1.102 electrical line rate interfaces that support fractional T1 or full T1 line rates.

Management logic 230 manages operation of interface device 140. Management device 230 provides security and QoS functions for interface device 140. Management device 230 also provides for secure methods of file transfer, for the purpose of application upgrades, log downloads, etc.

Figure 3:
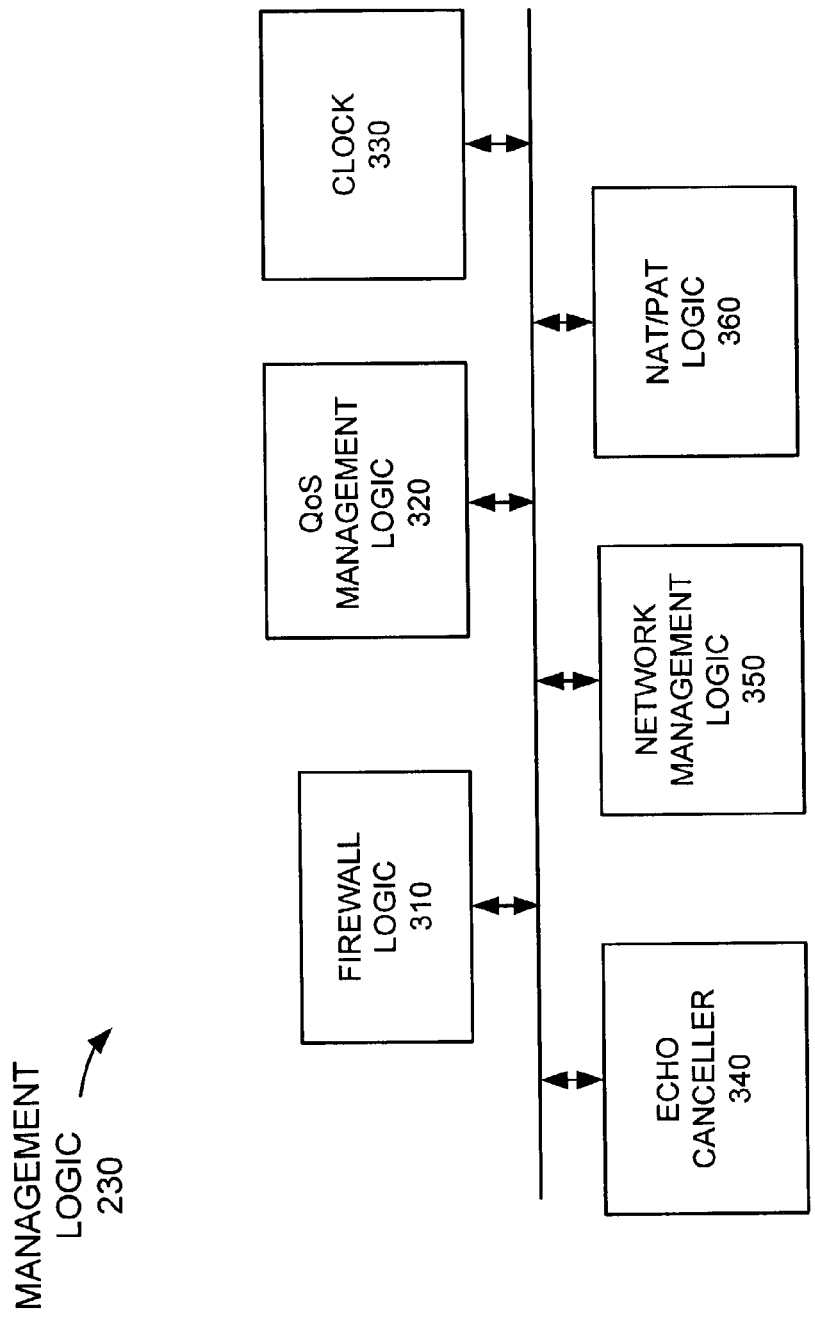
FIG. 3 illustrates an exemplary configuration of the management logic of FIG. 2 in an implementation consistent with the principles of the invention.

FIG. 3 illustrates an exemplary configuration of management logic 230 in an implementation consistent with the principles of the invention. As illustrated, management logic 230 may include firewall logic 310, QoS management logic 320, a clock 330, an echo canceller 340, network management logic 350, and network address translation (NAT)/port address translation (PAT) logic 360. It will be appreciated that management logic 230 may include other components that aid in the reception, processing, and/or transmission of data.

Firewall logic 310 provides packet filtering capabilities. In one implementation, this filtering may be based on a set of rules that causes firewall logic 310 to perform an action on incoming traffic based on source Internet Protocol (IP) address, source transport address, destination IP address, destination transport address, and the like. The performed action may include, for example, permitting the received traffic to be forwarded to customer devices 130 or discarding the traffic in the event that incoming traffic fails to satisfy the set of rules associated with firewall logic 310. Firewall logic 310 may include one or more dynamic rule sets for media based on SIP signaling.

QoS management logic 320 provides QoS services (e.g., classification, scheduling, policing, etc.) for interface device 140. In one implementation, the QoS services may include classifying incoming traffic flows, such as real-time transport protocol flows, based, for example, on packet header information (or other information). QoS management logic 320 may also implement class-based scheduling with priority queuing to provide low delay, low delay variation, and low loss rate for voice over IP (VOIP) traffic. QoS management logic 320 may also provide reporting capabilities, such as providing bandwidth usage reports, statistics on the number of dropped packets on a flow or class basis, traffic reports, such as traffic breakdown by user, by site, by network connection, etc., or other reports of interest to the customer.

Clock 330 provides a reference clock signal for use by interface device 140. Clock 330 may derive the reference clock signal from selected interfaces and/or from external timing interfaces (e.g., from an external DS1 timing interface). Interface device 140 may use the reference clock signal for synchronization purposes and/or for jitter/wander requirements. Echo canceller 340 provides echo control/cancellation for interface device 140. In one implementation, echo canceller 340 may include an ITU G.168-compliant echo canceller.

Network management logic 350 provides fault management, configuration management, accounting, performance management, and security functions for interface device 140. With respect to fault management, network management logic 350 detects, logs, and notifies users of, and, if possible, fixes problems to keep the network running effectively. Network management logic 350 may include alarm mechanisms to alert users or network administrators of, for example, system faults, network interface problems, hardware/software failures, and the like. Network management logic 350 may log protocol events (for both circuit-switched and SIP protocols) as they relate to call processing, call failures, and call abandonments with an explanation of the cause, and incoming messages that are incorrectly formatted, timestamp the logs, and monitor the number of active calls on interface device 140 at any given time.

With respect to configuration management, network management logic 350 may monitor network and interface device 140 configuration information so that the effects on network operation of various hardware and software elements can be tracked and managed. In one implementation, network management logic 350 may adhere to the SIP Management Information Base (MIB) User-Agent requirements that are known to those skilled in the art.

With respect to accounting, network management logic 350 may measure network-utilization parameters so that individual or groups of users on the network can be regulated appropriately. This information may be used for creation of billing information, as well as usage patterns.

With respect to performance management, network management logic 350 may measure and make available aspects of network performance, such as network throughput, user response times, and line utilization, so that inter-network performance can be maintained at an acceptable level. Network management logic 350 provides users with the ability to view the status of various interface device 140 components, such as Foreign Exchange Station (FXS)/Foreign Exchange Office (FXO) voice ports, trunk groups, and the like, and to enable and disable components of interface device 140. Network management logic 350 may also provide real-time statistics and counters related to a traffic stream. The statistics and counters may track jitter, latency, lost packets, error packets, packets that are out of sequence, dialed call completions, etc.

With respect to security management, network management logic 350 may control access to network resources so that the customer's network cannot be compromised and those without appropriate authorization cannot access sensitive information. In one implementation, network management logic 350 rejects or allows messages based on the IP address of the sender.

Network management logic 350 may also provide the ability to remotely control and configure interface device 140. Alternatively, network management logic 350 may allow interface device 140 to be controlled and/or configured via a serial connection. In either event, network management logic 350 may allow for the creation, modification, and editing of bandwidth policy, or the addition or modification of customer features and/or services. Access to interface device 140 may occur via a secure terminal emulation protocol, such as Secure Shell (SSH).

Figure 4:
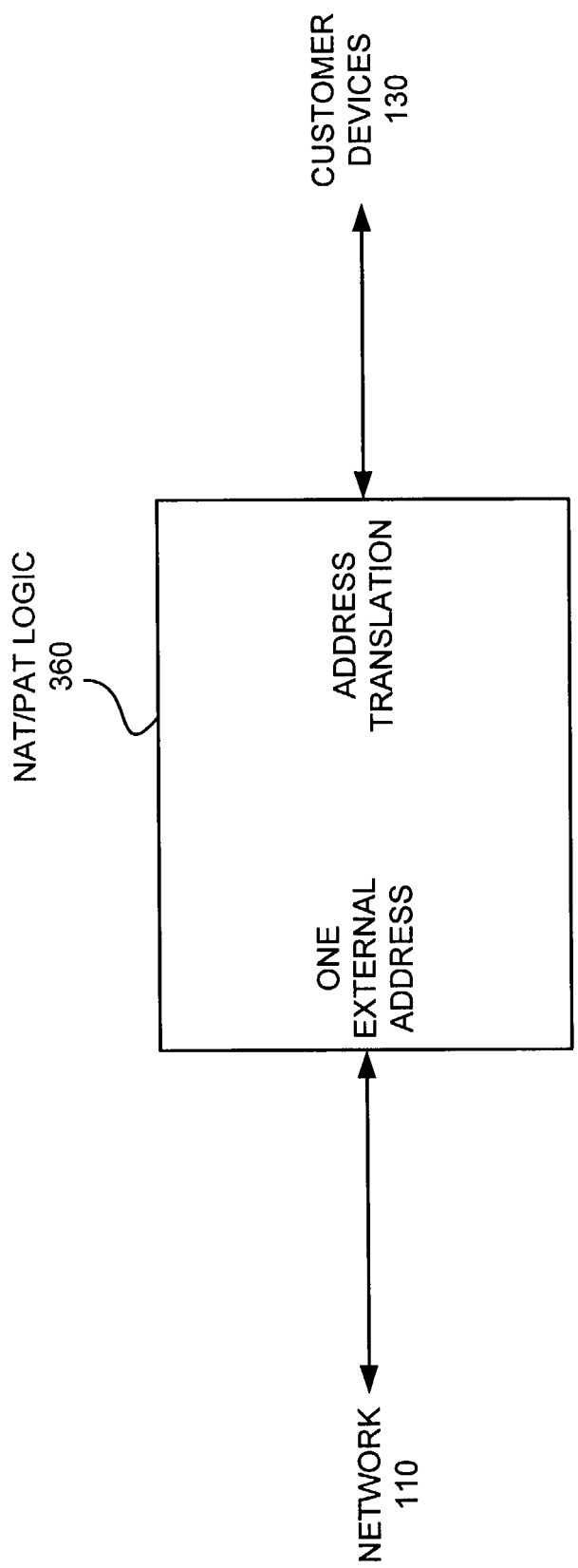
FIG. 4 illustrates an exemplary topology hiding operation of the network address translation (NAT)/port address translation (PAT) logic of FIG. 3 according to an implementation consistent with the present invention.

NAT/PAT logic 360 provides security and signal processing for traffic transmitted between customer devices 130 and network 110. NAT/PAT logic 360 may provide topology hiding capabilities, as illustrated in FIG. 4. NAT/PAT logic 360 hides the topology of the internal network (i.e., the network including customer devices 130) from external devices by translating network addresses and/or port addresses associated with customer devices 130 to one external address (e.g., an external IP address). It will be appreciated that SIP, the session description protocol (SDP), and the real-time transport control protocol (RTCP) embed host names, as well as IP addresses, into packets. To hide the internal network topology, NAT/PAT logic 360 may modify NAT, PAT, or secure flow processing (SFP) functionality to hide all internal addresses that may be embedded within SIP and RTCP packets with the external IP address(es) as they traverse interface device 140. In one implementation, NAT/PAT logic 360 dynamically assigns network addresses and port addresses to customer devices 130. NAT/PAT logic 360 may perform network address and port address translation at the session, presentation, and/or application layer.

Returning to FIG. 2, signal/bearer conversion logic 240 performs all necessary conversions for traffic transmitted between management logic 230 and voice port logic 250. In one implementation, signal/bearer conversion logic 240 performs signaling protocol conversion for traffic transmitted between a PBX and management logic 230. The signaling protocol conversion may include, for example, conversions between the SIP signaling protocol and the ISDN signaling protocol. Signal/bearer conversion logic 240 may also perform bearer channel conversion for traffic transmitted between an analog telephone and management logic 230. The bearer channel conversion may include, for example, conversions between an RTP format and an analog format.

Voice port logic 250 may include one or more ports for supporting Foreign Exchange Station (FXS) and Foreign Exchange Office (FXO) voice lines and fractional T1 and full T1 voice trunks. In one implementation, voice port logic 250 may include one or more RJ-11 FXS voice port electrical line rate interfaces, one or more RJ-11 FXO voice port electrical line rate interfaces, and one or more DS1 ANSI T1.102 electrical line rate interfaces. Voice port logic 250 supports well-known signaling protocols, such as Foreign Exchange Station Loop Start (FXSLS), Foreign Exchange Office Loop Start (FXOLS), Foreign Exchange Station Ground Start (FXSGS), Foreign Exchange Office Ground Start (FXOGS), ANSI PRI (Q.931) signaling protocol, and the like. Voice port logic 250 may also support Channel Associated Signaling (CAS) trunk types, dual tone multi-frequency (DTMF) dialed number transmittal and receipt over CAS trunk groups, multi-frequency (MF) dialed number transmittal and receipt over CAS trunk groups, sub-T1-size CAS trunk groups, and the like.

Figure 5:
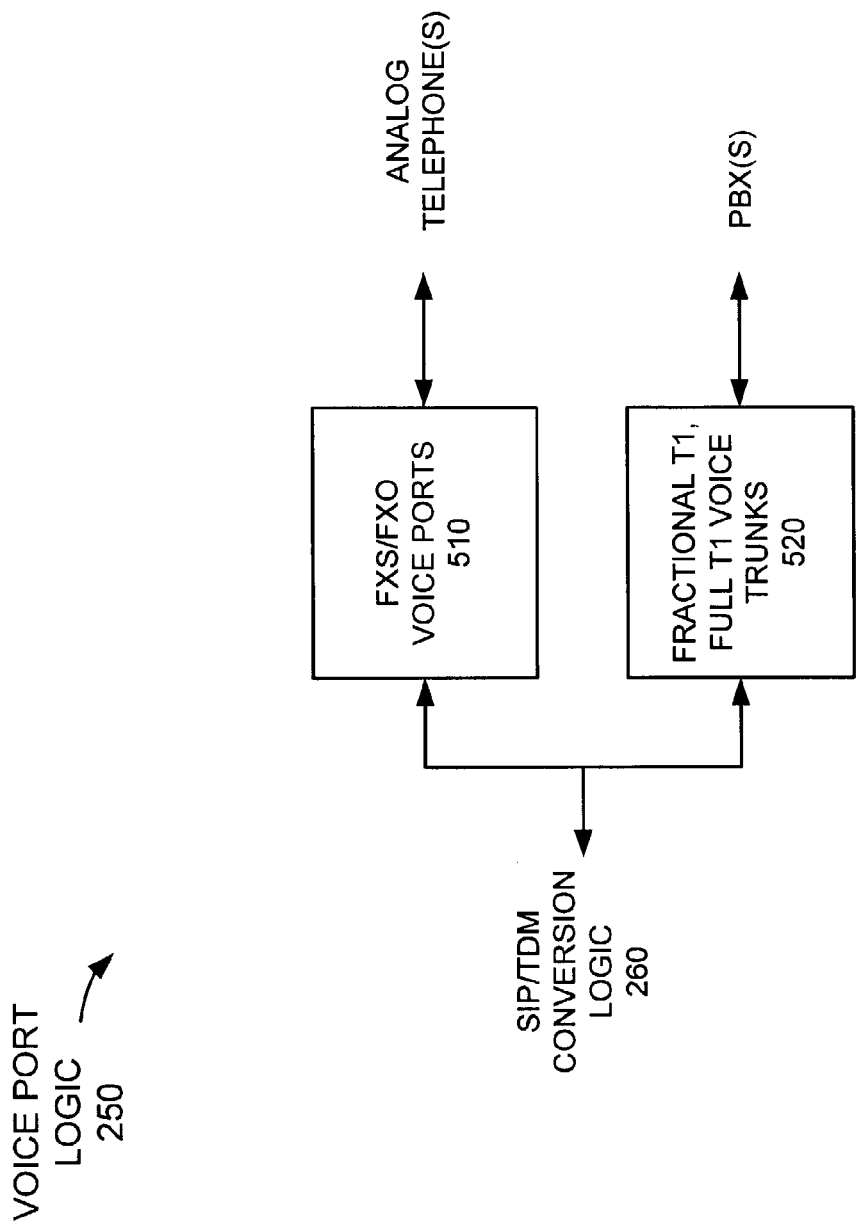
FIG. 5 illustrates an exemplary configuration of the voice port logic of FIG. 2 in an implementation consistent with the principles of the invention.

FIG. 5 illustrates an exemplary configuration of voice port logic 250 in an implementation consistent with the principles of the invention. As illustrated, voice port logic 250 may include voice ports 510 and voice trunks 520. Voice ports 510 may include one or more ports capable of supporting FXS/FXO voice lines for analog telephones. Voice trunks 520 may include voice trunks for supporting fractional T1 and/or full T1 line rates. Voice trunks 520 may connect to one or more PBXs.

Returning to FIG. 2, data port logic 260 may include one or more ports for supporting 1×N base T Ethernet, where N equals, 10, 100, etc. In one implementation, data port logic 260 supports 10 Mb/s half duplex Ethernet, 10 Mb/s full duplex Ethernet, 100 Mb/s half duplex Ethernet, 100 Mb/s full duplex Ethernet, 10/100 half/full auto-negotiation, wireless networking, virtual local area network (VLAN) tagging, and the like.

Exemplary Processing

FIG. 6 illustrates an exemplary process for routing traffic from network 110 through interface device 140 in an implementation consistent with the principles of the invention. Processing may begin with interface device 140 receiving traffic from a user device 120 via network 110 (act 610). It is assumed hereinafter that the received traffic is SIP traffic. It will be appreciated, however, that implementations consistent with the principles of the invention are equally applicable to other traffic types. The traffic may be received via DSL logic 210 or frame relay logic 220 and may, for example, be in the form of packets. Once received, the traffic may be filtered via firewall logic 310 (FIG. 3) (act 620). Firewall logic 310 may examine the incoming traffic and determine, based on a predetermined set of rules, whether to, for example, discard the traffic or forward the traffic toward its destination. As set forth above, firewall logic 310 may filter traffic based on source IP address, source transport address, destination IP address, destination transport address, and the like.

Interface device 140 may then perform QoS processing on the traffic (act 630). QoS management logic 320 may, for example, classify the traffic and schedule the traffic based on the classification. Based on the particular destination customer device 130 to which the traffic is destined, interface device 140 may process the traffic to put the traffic in a format suitable for the particular destination customer device 130

(act 640). For example, if the traffic is to be transmitted to an analog telephone or PBX, interface device 140 may perform any necessary bearer channel conversion or signaling conversion. In those situations where the received traffic is destined for a SIP-based device, such as a SIP telephone, signal processing may not be necessary.

Interface device 140 may then transmit the traffic to the appropriate customer device 130 (act 650). The traffic may be transmitted via voice port logic 250 or data port logic 260, based upon the particular customer device 130 to which the traffic is destined. If, for example, the traffic is destined for an analog telephone or a PBX, interface device 140 may transmit the traffic through voice port logic 250. If, on the other hand, the traffic is destined to a SIP device, such as a SIP telephone, interface device 140 may transmit the traffic through data port logic 260.

FIG. 7 illustrates an exemplary process for routing traffic from one or more customer devices 130 through interface device 140 in an implementation consistent with the principles of the invention. Processing may begin with interface device 140 receiving traffic from one or more customer devices 130 (act 710). The traffic may be received via voice port logic 250 or data port logic 260 and may, for example, be in the form of packets, analog signals, or ISDN signals.

Based on the particular customer device 130 from which the traffic is received, interface device 140 may process the traffic to put the traffic in a form suitable for transmission on network 110 (act 720). For example, if the traffic is received via voice port logic 250, interface device 140 may perform any necessary bearer channel conversion or signaling conversion. In those situations where the traffic is received via data port logic 260, signal processing may not be necessary since the traffic may already be in a form suitable for transmission on network 110.

Interface device 140 may then perform QoS processing on the traffic (act 730). QoS management logic 320 may, for example, classify the traffic and schedule the traffic based on the classification. Interface device 140 may translate a source address associated with the received traffic to a network address (act 740). This address translation may be NAT or PAT and acts to hide addresses of customer devices 130 from user devices 120 connected to network 110. As described above, the address translation may be performed at the session layer, presentation layer, and/or application layer.

Interface device 140 may transmit the traffic to network 110 (act 750). The traffic may be transmitted via DSL logic 210 or frame relay logic 220 and may be formatted accordingly based upon the particular port (i.e., DSL or frame relay) from which the traffic is transmitted.

CONCLUSION

Systems and methods, consistent with the present invention, provide an integrated SIP-enabled CPE device that provides customers with a firewall, QoS processing, routing capabilities, and Ethernet switching functionality. This single CPE device allows customers to update or add new features and/or services without having to continually buy new hardware to obtain these features/services.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 6 and 7, the order of the acts may be varied in other implementations consistent with the present invention. Moreover, non-dependent acts may be implemented in parallel.

Certain portions of the invention have been described as "logic" that performs one more functions. This logic may include hardware, such as an application specific intergrated circuit or a field programmable gate array, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device comprising:
   one or more voice ports to communicate with one or more analog devices;
   one or more data ports to communicate with one or more Session Initiation Protocol (SIP) devices;
   one or more network ports to communicate with a network; and
   at least one logic, at least partially implemented in hardware, configured to:
   receive, via at least one of the one or more network ports, configuration information transmitted via the network from a remote device,
   establish:
      a first communication associated with an analog device of the one or more analog devices, the analog device being connected to a voice port of the one or more voice ports, and
      a second communication associated with an SIP device of the one or more SIP devices, the SIP device being connected to a data port of the one or more data ports,
   filter, based on the configuration information, first traffic and second traffic received via the one or more network ports, the first traffic being associated with the first communication, and the second traffic being associated with the second communication,
   perform, based on the configuration information, quality of service (QoS) processing on the filtered first traffic and the filtered second traffic to schedule delivery of the filtered first traffic to the analog device and delivery of the filtered second traffic to the SIP device,
   convert, based on the configuration information, the filtered first traffic for transmission to the analog device,
   transmit, based on performing the QoS processing and the configuration information, the converted filtered first traffic to the analog device via the voice port, and the filtered second traffic to the SIP device via the data port,
   provide, to a user of the network device, a status of the voice port and real-time statistics associated with transmission of the converted filtered first traffic and the filtered second traffic based on performing the QoS processing,
   determine, based on the configuration information and based on the status of the voice port and the real-time statistics, to disable the voice port, and
   disable, based on the determination, the voice port to terminate the first communication.

2. The network device of claim 1, where the one or more voice ports include:
   at least one Foreign Exchange Station (FXS)/Foreign Exchange Office (FXO) voice port, and
   at least one of a T1 trunk group or a fractional T1 trunk group.

3. The network device of claim 2, where the at least one logic is further to:
   translate signals, exchanged by the at least one FXS/FXO voice port and the at least one of the T1 trunk group or fractional T1 trunk group, between SIP and a SIP/Time Division Multiplex (TDM) signaling protocol.

4. The network device of claim 1, where the one or more analog devices include at least one of:
   an analog telephone, or
   a private branch exchange.

5. The network device of claim 1, where the one or more data ports include at least one Ethernet port.

6. The network device of claim 1, where the one or more network ports include:
   at least one digital subscriber line (DSL) port, and
   at least one frame relay port.

7. The network device of claim 1, where the configuration information includes a set of rules, and
   where the at least one logic, when filtering the first traffic and the second traffic, is further to:
      filter the first traffic and the second traffic based on the set of rules.

8. The network device of claim 1, where, when performing the QoS processing, the at least one logic is further to:
   classify the first traffic and the second traffic, and
   schedule the first traffic for transmission via the voice port and the second traffic for transmission via the data port based on the classifying.

9. The network device of claim 1, further comprising:
   a clock to generate a reference clock signal; and
   an echo canceller to provide echo control and cancellation to modify the generated reference clock signal,
   where the at least one logic, when performing the QoS processing, is further to perform the QoS processing based on the modified reference clock signal.

10. The network device of claim 1, where the at least one logic is further to:
   provide one or more of:
      fault management,
      configuration management,
      accounting, or
      security for the network device.

11. The network device of claim 10, where, when providing the fault management, the at least one logic is further to:
   detect faults associated with the network device, and
   provide the fault management based on the detected fault.

12. The network device of claim 10, where, when providing the configuration management, the at least one logic is further to:
   monitor for updates associated with the configuration information.

13. The network device of claim 10, where, when providing the accounting, the at least one logic is further to:
   measure one or more network-utilization parameters associated with the first communication and the second communication.

14. A network device comprising:
   at least one voice port to communicate with at least one analog telephone;
   at least one voice trunk to communicate with a private branch exchange (PBX);
   at least one data port to communicate with at least one Session Initiation Protocol (SIP) device;
   at least one network port to communicate with a network; and
   at least one logic, at least partially implemented in hardware, configured to:
      receive, via the at least one network port, configuration information transmitted via the network from a remote device,
      establish a first communication associated with a device connected to one of the at least one voice port or the PBX, and a second communication associated with a SIP device of the at least one SIP device, the device being associated with a first private address, and the SIP device being associated with a second private address,
      receive, via the at least one network port, first traffic associated with the first communication and second traffic associated with the second communication, the first traffic being addressed to a first public address associated with the device, and the second traffic being addressed to a second public address associated with the SIP device,
      rewrite the first traffic to replace the first public address with the first private address,
      rewrite the second traffic to replace the second public address with the second private address,
      convert, based on the configuration information, the first traffic for transmission to the device,
      provide, based on the configuration information, quality of service (QoS) management for the converted first traffic and the second traffic to schedule delivery of the converted first traffic to the device and delivery of the second traffic to the SIP device,
      transmit, based on the QoS management and the configuration information, the converted first traffic to the device, and the second traffic to the SIP device,
      provide, to a user of the network device, a status of a particular one of the at least one voice port, the at least one voice trunk, the at least one data port, and the at least one network port, and real-time statistics associated with the first communication and the second communication based on providing the QoS management, and
      configure the particular one of the at least one voice port, the at least one voice trunk, the at least one data port, and the at least one network port based on the status and the real-time statistics,
      the at least one logic, when configuring the particular one of the at least one voice port, the at least one voice trunk, the at least one data port, and the at least one network port, being further to enable or disable the particular one of the at least one voice port, the at least one voice trunk, the at least one data port, and the at least one network port.

15. The network device of claim 14, where the at least one voice port includes a Foreign Exchange Station (FXS)/Foreign Exchange Office (FXO) voice port.

16. The network device of claim 14, where the at least one voice trunk includes at least one of a T1 voice trunk or a fractional T1 voice trunk.

17. The network device of claim 14, where the at least one logic, when converting the first traffic for transmission to the device, is further to:
   perform a bearer channel conversion and a signaling conversion to convert the first traffic into a particular type of format.

18. The network device of claim 14, where the at least one data port includes an Ethernet port.

19. The network device of claim 14, where the at least one network port includes one or more of a digital subscriber line (DSL) port or a frame relay port.

20. The network device of claim 14, where the at least one logic is further to:
  filter traffic received from the network.

21. The network device of claim 14, where the at least one logic includes a network address translator (NAT) and a port address translator (PAT), the NAT and the PAT being used when rewriting the first traffic and rewriting the second traffic.

22. The network device of claim 14, where the network device includes a customer premises equipment (CPE) device.

23. A method comprising:
  receiving, by a network device and via a network, configuration information;
  communicating, by the network device, with at least one analog telephone device based on the configuration information;
  communicating, by the network device, with at least one Session Initiation Protocol (SIP) device based on the configuration information;
  communicating, by the network device, with the network based on the configuration information;
  providing, by the network device and based on the configuration information, quality of service (QoS) services for traffic received while communicating with the at least one analog telephone device, the at least one SIP device, and the network to schedule transmission of the traffic from the network device;
  filtering, by the network device and based on the configuration information, a portion of the traffic received from the network;
  providing, by the network device and to a remote device, a status of a particular voice port of the network device and real-time statistics associated with dialed call completions based on providing the QoS management, the particular voice port connecting the network device to the at least one analog telephone device;
  receiving, by the network device and from the remote device, instructions to disable the particular voice port based on the status and the real-time statistics; and
  disabling, by the network device, the particular voice port based on the instructions.

24. The method of claim 23, where the at least one analog telephone device includes at least one of an analog telephone or a private branch exchange.

25. The method of claim 23, where communicating with the network includes:
  communicating with the network via one or more digital subscriber line (DSL) ports and one or more frame relay ports.

26. A Session Initiation Protocol (SIP) device comprising:
  one or more voice ports to provide voice services;
  one or more data ports to provide data services; and
  at least one logic configured to:
    receive configuration information from a remote device;
    filter incoming traffic based on the configuration information,
    provide quality of service (QoS services for traffic, transmitted from the SIP device to schedule transmission, from the network device, of the traffic,
    provide, to a user of the SIP device and based on providing the QoS services, a status of a particular voice port of the one or more voice ports and statistics associated with dialed call completions,
    receive, from the user and based on providing the status and the statistics, instructions to enable the particular voice port, and
    enable the particular voice port based on the instructions.

27. The network device of claim 1, where the at least one logic is further to:
  assign respective network addresses to the one or more SIP devices,
  translate the network addresses to a single external address, and
  embed the single external address within a portion of traffic received from the one or more data ports.

28. The network device of claim 1, where the at least one logic is further to:
  detect a hardware or software failure of the network device, and
  alert the user regarding the hardware or software failure.

\* \* \* \* \*